Dec. 30, 1941.　　　M. F. A. JULIEN　　　2,267,981
ELASTIC PULLEY AND WHEEL AND THE LIKE
Filed Oct. 19, 1937
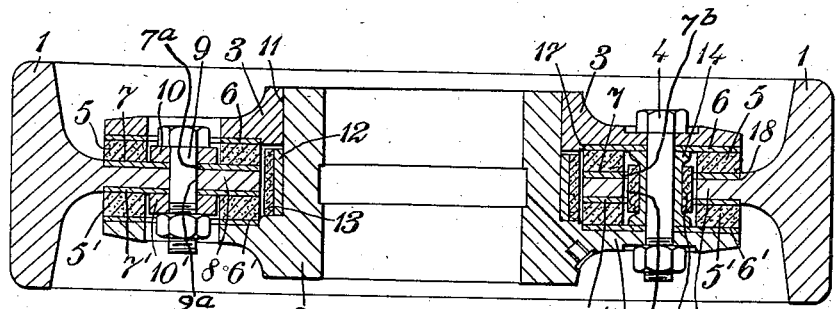
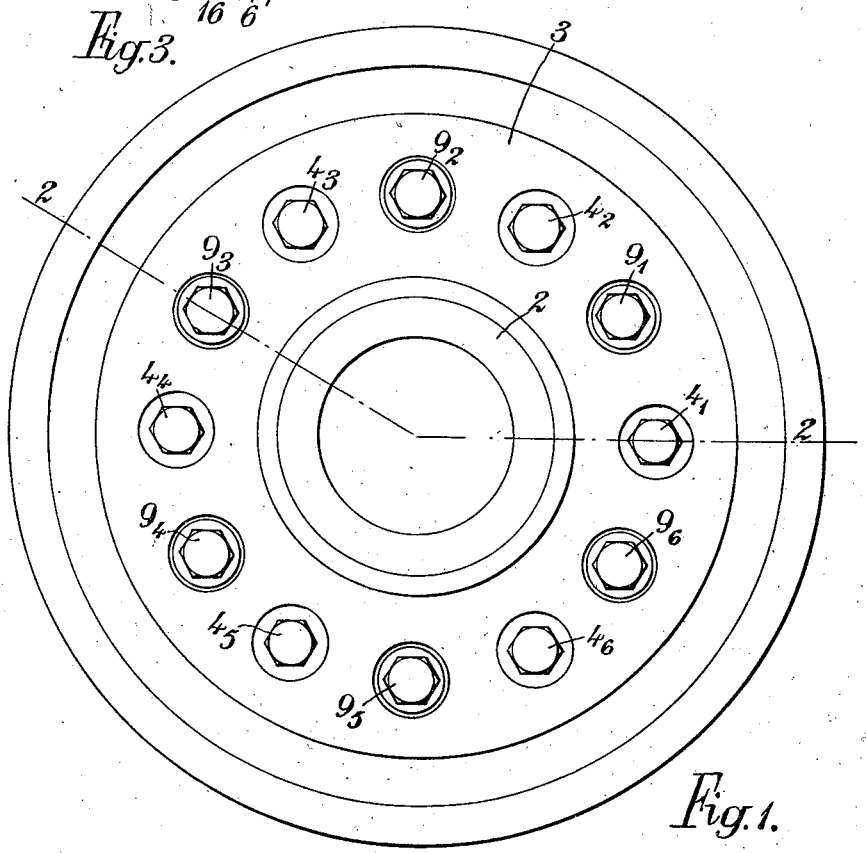
M. F. A. Julien, Inventor
By: Glascock Downing & Seebold, Attys.

Patented Dec. 30, 1941

2,267,981

UNITED STATES PATENT OFFICE 2,267,981

ELASTIC PULLEY AND WHEEL AND THE LIKE

Maurice François Alexandre Julien, Paris, France

Application October 19, 1937, Serial No. 169,905
In France October 20, 1936

4 Claims. (Cl. 152—42)

The present invention relates to improvements in the construction of elastic pulleys and wheels and the like comprising elastic means between the rim and the axle in order to protect one of these members from vibrations to which the other member may be subjected.

It is characterised by a particular arrangement of members giving the elasticity in such a way as to ensure easy and exact mounting.

The principle of the invention thus consists in the use in combination of a rim with a central disc, a hub with a lateral cheek and a guided countercheek gripping on resilient members, the said resilient members being applied firstly against the central disc of the rim and secondly against the cheek and countercheek of the hub on which they are preferably centered, and comprising suitable slipping means and gripping means.

The invention will be better understood by the description of the attached drawing which represents only by way of example forms of embodiment of the invention.

In the drawing are seen:

Figure 1 a front view of a wheel or pulley according to the invention,

Figure 2 a section along II—II of Figure 1,

Figure 3 a detail of a modification of the elastic masses.

As seen in Figures 1 and 2, the pulley shown, used for a tank roller, a transmission pulley, a lift pulley or a wheel for railway rolling stock for example, etc., comprises a metallic rim 1, covered if necessary with an elastic tyre and a ring-like cheek 2 integral with the hub.

Furthermore a removable countercheek 3 may be gripped by bolts such as 4 co-operating with cross-pieces 14, and any number of bolts (in Figure 1 six of these are shown: $4_1$, $4_2$, $4_3$, etc.) which grip on the wheel body after the insertion of the elastic members.

The elastic members such as shown, consist of two identical rubber rings 5, 5' symmetrically mounted. The mass of rubber shown at 5 adheres to a flat metal sheet 6 on which grips the countercheek 3, and preferably centered on shoulders 17 on this countercheek and on a flat metal plate 7 on which is applied the radial web or cheek 8 of the rim, shoulders 18 being also preferably provided. In this radial part are arranged holes $9^a$ to permit the passage of securing bolts 9 (six of these bolts $9_1$, $9_2$, $9_3$, etc. are shown in Figure 1).

In the metal plate 7 are also provided holes $7^a$ corresponding to the holes $9^a$ and aligning with the holes in which the bolts 9 are fixed relative to the hub.

Finally gripping members 10, 10' abut on a part 7 sufficient to ensure a perfect gripping by means of bolts 9. It is to be noted that the bolts 9 are fixed relative to the rim and alternately arranged with respect to the bolts 4.

In the metal plates 6, 6' are, of course, provided holes of larger diameter permitting the bolt 9 to pass through and permitting radial movement of the rim with respect to the hub, the rubber of the plates 6, 6' operating under shear in the case shown.

In the same manner the metal plates 7, 7' and the cheek 8 are pierced with holes $7^b$ and $8^b$ of larger diameter for the passage of cross-pieces 14 in order to permit a certain play in the radial movement or in the angular movement of the rim.

The countercheek 3 must, of course, be guided during the gripping in order to remain quite parallel to the cheek 2; also the cylindrical part 11 of the hub ensures this guiding.

The arrangement described is completed by slipping members limiting the possible amplitudes of the rim and the hub or opposing them by a rapidly increasing hardness. For the radial slipping, this is ensured by the rim 12 provided with rubber 13, for example in adhesion.

For the angular slipping, this role is fulfilled by the cross-pieces 14, themselves also provided, if desired, with adhesive rubber as shown at 14'. These cross-pieces 14 and the rim 12 further serve to adjust the thickness given to the rubber 5, 5' and to adjust its initial compression if this is required.

The arrangement described comprises advantages which must be noted.

Firstly there is a considerable simplification of the parts; the metal plates 6, 6' and 7, 7' in particular may be identical and identically pierced, the metal plates 6, 6' being simply staggered $\frac{1}{12}$ of a revolution with respect to the members 7, 7' (six large holes interposed with six small holes).

Furthermore, the fact of having elastic members independent of the members of the wheel itself permits a reduction to the minimum of the rubber surface adhering to the metal, resulting in maximum facility for moulding and, if desired, for brass-plating of the metal parts.

The embodiment described does not limit the features of the invention and in particular it is specified that the use of rubber in adhesion to the metal is in no way necessary.

Figure 3 represents, with reference to this matter, elastic members with rubber in compression. The metal plates 6, 6' and 7, 7' are then provided with rims 15, 15' which enclose while gripping the rubber mass 5, 5' which will consequently operate, by a radial movement of the rim for example, by compression of the rim 15 and of the diagonally opposite rim.

For a similar purpose, radial ribs, of which one has been shown at 16, may increase the strength which is opposed to the angular displacements of the rim.

In such a case the use of special metal plates 6 and 7 is not necessary and the rims 15 may be provided directly on the cheek, countercheek and central disc of the rim.

Another arrangement which evidently does not depart beyond the scope of the invention, is that wherein the rim has a lateral cheek, the hub having a central disc playing the part of the member 8, the lateral countercheek being then guided internally in the rim by a cylindrical surface provided for this purpose.

It must also be noted that all the devices intended to modify the elasticity of the members of rubber or the like and in particular those described in the French application No. 400,681 filed May 15, 1936, now Patent Number 817,656, due to the same inventor, are applicable to the object of the invention.

Obviously, the embodiments shown in the attached drawing and described do not limit the invention. This comprises also all variations and modifications of detail in conformity with the spirit of the invention.

I claim:

1. A resilient wheel comprising a hub having spaced cheeks, a rim having a central radial cheek positioned between the cheeks on the hub, resilient means arranged laterally between the cheeks, means alternately arranged transversely between the cheeks and resilient means and alternately anchored to the cheeks on the hub and the cheek on the rim for clamping the cheeks and resilient means together and permitting relative limited movement between the cheeks, and other resilient means arranged transversely of the first mentioned resilient means and carried with the clamping means which are anchored to the cheeks of the hub.

2. A wheel of the character described comprising a hub, a ring-like cheek integral with the hub, a counter-cheek removably mounted on the hub and arranged in spaced and parallel relation to the fixed cheek, a rim, a radial cheek integral with the rim and arranged between the cheeks on the hub, resilient rings arranged on each side of said radial cheek, metal plates adhesively secured to the opposite sides of the resilient rings and frictionally engaged by the cheeks, the cheeks on the hub and rim and the metal plates immediately adjacent thereto having alternately large and small transverse apertures, the small apertures of the radial cheek and the adjacent plates aligning with the large apertures in the cheeks on the hub while the large apertures in the radial cheek and the adjacent plates align with the small apertures in the cheeks on the hub and the plates immediately adjacent thereto, and bolt and nut arrangements passing through all of the said aligning apertures and alternately fixed to the radial cheeks and to the cheeks on the hub.

3. A resilient wheel as claimed in claim 2, in which members are arranged on the bolts for cooperating with the edges of the adjacent apertures in the resilient rings and the radial cheek on the rim.

4. A resilient wheel comprising a hub member and a rim member, spaced cheeks on one of said members and a radial cheek on the other member positioned between said spaced cheeks, resilient means arranged laterally between the cheeks, means alternately arranged transversely between the cheeks and resilient means and alternately anchored to the spaced cheeks and to the radial cheek for clamping the cheeks and resilient means together and permitting relative limited movement between the cheeks, and other resilient means arranged transversely of the first-mentioned resilient means and carried with certain of the clamping means.

MAURICE FRANÇOIS ALEXANDRE JULIEN.